(12) United States Patent
Kameda et al.

(10) Patent No.: US 8,745,425 B2
(45) Date of Patent: Jun. 3, 2014

(54) COMPUTER SYSTEM WITH BLADE SYSTEM AND MANAGEMENT SERVER

(75) Inventors: Yasuhiro Kameda, Hadano (JP);
Hirofumi Fujita, Kawasaki (JP);
Satoshi Oguni, Yokohama (JP);
Morihide Nakaya, Hadano (JP)

(73) Assignee: Hitachi, Ltd., Tokyo (JP)

( * ) Notice: Subject to any disclaimer, the term of this patent is extended or adjusted under 35 U.S.C. 154(b) by 334 days.

(21) Appl. No.: 13/122,518

(22) PCT Filed: Oct. 31, 2008

(86) PCT No.: PCT/JP2008/069864
§ 371 (c)(1),
(2), (4) Date: Jun. 24, 2011

(87) PCT Pub. No.: WO2010/050041
PCT Pub. Date: May 6, 2010

(65) Prior Publication Data
US 2011/0252254 A1    Oct. 13, 2011

(51) Int. Cl.
*G06F 1/26* (2006.01)
*G06F 1/32* (2006.01)

(52) U.S. Cl.
CPC ........................... *G06F 1/32* (2013.01)
USPC .......................................................... 713/320

(58) Field of Classification Search
CPC ............................................... G06F 1/32
USPC .................................... 713/300, 320
See application file for complete search history.

(56) References Cited

U.S. PATENT DOCUMENTS

| 7,734,782 | B2 | 6/2010 | Ishida |
| 8,013,805 | B2 * | 9/2011 | Piazza et al. ................ 345/1.1 |
| 2003/0033517 | A1 * | 2/2003 | Rutherglen et al. ........... 713/153 |
| 2003/0055969 | A1 * | 3/2003 | Begun et al. ................. 709/226 |
| 2003/0225904 | A1 | 12/2003 | Kanno et al. |
| 2004/0107273 | A1 | 6/2004 | Biran et al. |
| 2010/0050004 | A1 * | 2/2010 | Hamilton et al. ............ 713/320 |
| 2011/0004656 | A1 | 1/2011 | Egashira et al. |

FOREIGN PATENT DOCUMENTS

| JP | 2003-281008 | 10/2003 |
| JP | 2006-508445 | 3/2006 |

(Continued)

OTHER PUBLICATIONS

PCT International Search Report on application No. PCT/JP2008/069864 mailed Feb. 3, 2009; 4 pages.

*Primary Examiner* — Mohammed Rehman
(74) *Attorney, Agent, or Firm* — Foley & Lardner LLP (57) ABSTRACT

Provided is a computer system in which power consumption of the system can be reduced and which can smoothly supply data for a request from a client and avoid increase in a failure rate. In the computer system, by maintaining a power activation threshold for activating a stopping server blade and load balance threshold for assigning the request to a server blade, a server blade whose power is activated but to which the request from the client is not assigned is previously arranged. Priorities of the server blades are maintained, and are periodically changed or are changed in accordance with operation information such as total operation time and the number of times of activation/stop. Further, by maintaining the power activation threshold and a power stop threshold, possibilities of the unbalance among the activated/stopped server blades and frequent control of the activation/stop only in a part of server blades are avoided.

7 Claims, 7 Drawing Sheets

(56) References Cited

FOREIGN PATENT DOCUMENTS

| JP | 2007-004595 A | 1/2007 |
| JP | 2008-117145 | 5/2008 |
| JP | 2008-129828 A | 6/2008 |
| JP | 2011-015196 | 1/2011 |

* cited by examiner

| SERVER BLADE NUMBER | PRIORITY | STATUS | PROCESSING AMOUNT | NUMBER OF TIMES OF ACTIVATION/STOP | TOTAL OPERATION TIME |
|---|---|---|---|---|---|
| #0 | 9 | OPERATING | 30 | | |
| #1 | 8 | OPERATING | 30 | | |
| #2 | 7 | OPERATING | 25 | | |
| #3 | 6 | OPERATING | 0 | | |
| #4 | 5 | OPERATING | 0 | | |
| #5 | 4 | ACTIVATION PROCESSING | 0 | | |
| #6 | 3 | STOPPING | 0 | | |
| #7 | 2 | STOPPING | 0 | | |
| #8 | 1 | STOPPING | 0 | | |

| SERVER BLADE NUMBER | PRIORITY | STATUS | PROCESSING AMOUNT | NUMBER OF TIMES OF ACTIVATION /STOP | TOTAL OPERATION TIME |
|---|---|---|---|---|---|
| #0 | 3 | STOPPING | 0 | | |
| #1 | 2 | STOPPING | 0 | | |
| #2 | 1 | STOPPING | 0 | | |
| #3 | 9 | OPERATING | 30 | | |
| #4 | 8 | OPERATING | 30 | | |
| #5 | 7 | OPERATING | 25 | | |
| #6 | 6 | OPERATING | 0 | | |
| #7 | 5 | OPERATING | 0 | | |
| #8 | 4 | ACTIVATION PROCESSING | 0 | | |

FIG. 6

| SERVER BLADE NUMBER | PRIORITY | STATUS | PROCESSING AMOUNT | NUMBER OF TIMES OF ACTIVATION /STOP | TOTAL OPERATION TIME |
|---|---|---|---|---|---|
| #0 | 3 | STOPPING | 0 | 10 | |
| #1 | 6 | OPERATING | 25 | 5 | |
| #2 | 8 | OPERATING | 0 | 8 | |
| #3 | 1 | STOPPING | 0 | 12 | |
| #4 | 4 | OPERATING | 30 | 2 | |
| #5 | 7 | OPERATING | 0 | 7 | |
| #6 | 5 | OPERATING | 30 | 3 | |
| #7 | 9 | ACTIVATION PROCESSING | 0 | 9 | |
| #8 | 2 | STOPPING | 0 | 11 | |

FIG. 7

| SERVER BLADE NUMBER | PRIORITY | STATUS | PROCESSING AMOUNT | NUMBER OF TIMES OF ACTIVATION /STOP | TOTAL OPERATION TIME (min) |
|---|---|---|---|---|---|
| #0 | 2 | STOPPING | 0 | | 120 |
| #1 | 6 | OPERATING | 0 | | 65 |
| #2 | 5 | OPERATING | 0 | | 85 |
| #3 | 9 | OPERATING | 30 | | 33 |
| #4 | 7 | OPERATING | 25 | | 57 |
| #5 | 3 | STOPPING | 0 | | 115 |
| #6 | 1 | STOPPING | 0 | | 145 |
| #7 | 4 | ACTIVATION PROCESSING | 0 | | 110 |
| #8 | 8 | OPERATING | 30 | | 45 |

COMPUTER SYSTEM WITH BLADE SYSTEM AND MANAGEMENT SERVER

TECHNICAL FIELD

The present invention relates to a computer system configured with a management server and a blade system having a plurality of server blades, and more particularly, the present invention relates to operation control for a blade system in which reduction of power consumption of the system is achieved with performing load balance (distribution).

BACKGROUND ART

Recently, a server system as aiming at data acquisition by the connection from a client to a server via a network has been widely used. A typical one is the Internet access mode.

Recently, as these server systems, a blade system including a plurality of server blades has been used often.

Also, as aiming at handling rapid increase in the access or keeping fault tolerance, a request from the client is balanced (distributed) for each server blade for processing often. A device for the distribution processing is called a load balancer.

In the load balance, for each server blade configuring the blade system, a method of uniformly balancing the load is generally used.

For example, methods such as "the minimum access mode" which selects a server blade having the smallest number of connections from/to the client and "the fastest response mode" which selects a server blade having the shortest response time for the request are used often.

However, in this case, in spite of a processable method by a small number of server blades when performances of the server blades are high, it is required to activate all server blades regardless of their processing amounts. Therefore, there is a possibility that power consumption of entire system is increased.

Accordingly, as a new method against the general load-balancing methods, the one disclosed in, for example, Japanese Patent Application Laid-Open Publication No. 2003-281008 (Patent Document 1) is cited.

The one disclosed in Patent Document 1 distributes the request from the client preferentially to a server having the shortest operation time, and besides, can start up only the least required servers for the entire server system by comparing a data request amount from the client with a data supply possible amount.

Patent Document 1: Japanese Patent Application Laid-Open Publication No. 2003-281008

DISCLOSURE OF THE INVENTION

Problems to be Solved by the Invention

However, conventional techniques including the one of the above-described Patent Document 1 have the following two problems.

As a first problem, a situation of increase in the request from the client is considered.

Here, in the technique described in Patent Document 1, the number of operating servers is optimized by comparing the data request amount from the client with the data supply possible amount of a group of the operating servers, so that a stopping server is power-activated.

In this case, a certain time is required from the start of the server activation through the receiving of the request from the client to the start of processing. Therefore, when the processing from the client is rapidly increased, assignment for the processing to the server may be delayed.

As a second problem, in the technique described in Patent Document 1, activated and stopped servers are determined based on power consumed by the server, and therefore, there is a possibility that unbalance among the activated and stopped servers may be caused in only a part of servers.

Also, when a situation that increase and decrease in the request from the client are repeated within a narrow range is taken into consideration, if the narrow range is a range judged as a request of additional server activation, there is a possibility that a part of servers may be intensively activated and stopped for short time.

As characteristics of electric and electronic equipment, heat expansion is caused due to temperature increase at the power activation, and shrinkage is contrarily caused due to temperature decrease at the power stop.

As a result, a substrate, each element, solder, and others are easily deteriorated, and easily broken. That is, when the activation and stop are intensively controlled in the part of servers, there is a high possibility that the servers are broken.

Accordingly, a preferred aim of the present invention is to provide a computer system capable of reduction of power consumption of the system, and besides, capable of achieving smooth data supply for the request from the client and avoiding increase in a failure rate.

The above and other preferred aims and novel characteristics of the present invention will be apparent from the description of the present specification and the accompanying drawings.

Means for Solving the Problems

The typical ones of the inventions disclosed in the present application will be briefly described as follows.

That is, as a summary of the typical one, a blade system and a management server are provided, the blade server including: a priority maintaining unit for maintaining a priority set in each of a plurality of server blades; a load-balance-threshold maintaining unit for maintaining a load balance threshold for balancing a processing amount of each of the plurality of server blade; and a load balancing blade for assigning a processing of a request from a client preferentially to a server blade having a higher priority among a plurality of operating server blades, and a management server including: a judgment table for storing information from a monitoring unit for server-blade operation status; a maintaining unit for a power activation threshold for maintaining the power activation threshold for activating the plurality of server blades; a maintaining unit for a power stop threshold for maintaining the power stop threshold for stopping the plurality of server blades; and a judging unit for judging activation or stop of the plurality of server blades based on the information of the judgment table, the power activation threshold, and the power stop threshold to control a power controlling unit. The judging unit stops a server blade to which the processing of the request is not assigned by the load balancing blade among the plurality of server blades.

Effects of the Invention

The effects obtained by typical aspects of the present invention will be briefly described below.

That is, as the effects obtained by typical aspects, in a computer system including a blade system with a load-balancing function, power consumption can be reduced.

In addition, by setting a power activation threshold and a load balance threshold for each server blade or setting the maximum number of stand-by server blades and the minimum number of stand-by server blades, data can be rapidly supplied when the request from the client is rapidly increased. Also, by changing a priority of each server blade, setting the power activation threshold and the load balance threshold, or setting the maximum number of stand-by server blades and the minimum number of stand-by server blades, unbalance among the activated/stopped server blades is decreased, so that a failure rate of the blade system can be decreased.

BEST MODE FOR CARRYING OUT THE INVENTION

Hereinafter, embodiments of the present invention will be described in detail with reference to the accompanying drawings. Note that components having the same function are denoted by the same reference symbols throughout the drawings for describing the embodiment, and the repetitive description thereof will be omitted.

Figure 1:
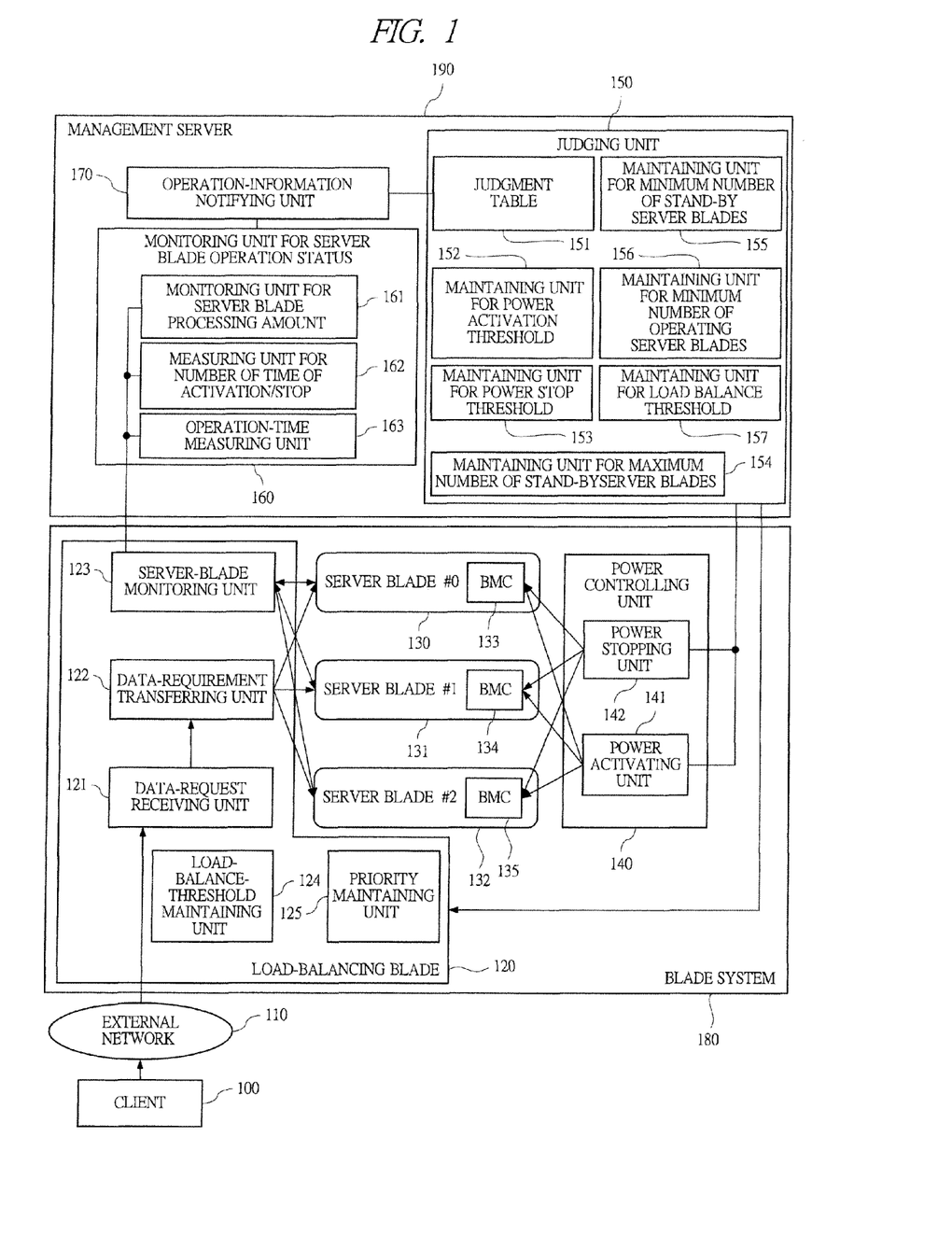
FIG. 1 is a configuration diagram illustrating a configuration of a computer system according to an embodiment of the present invention.

With reference to FIG. 1, a configuration of a computer system according to an embodiment of the present invention is described. FIG. 1 is a configuration diagram illustrating the configuration of the computer system according to the embodiment of the present invention.

In FIG. 1, the computer system includes: a blade system 180; and a management server 190 for managing an operation of the blade system and controlling the operation.

The blade system 180 includes: server blades 130 to 132 for processing a request from a client 100; a load balancing blade 120 for assigning the request from the client 100 to each of the server blades 130 to 132; and a power controlling unit 140 for commanding activation or stop to each of the server blades 130 to 132 in accordance with an instruction from the management server 190.

The load balancing blade 120 includes: a data-request receiving unit 121; a data-request transferring unit 122; a server-blade monitoring unit 123; a load-balance-threshold maintaining unit 124; and a priority maintaining unit 125.

The power controlling unit 140 includes: a power activating unit 141; and a power stopping unit 142.

Also, the management server 190 includes: a monitoring unit 160 for a server blade operation status; a judging unit 150; and an operation-information notifying unit 170.

The monitoring unit 160 for the server blade operation status includes: a monitoring unit 161 for server blade processing amount for monitoring processing amounts of the server blades 130 to 132; a measuring unit 162 for the number of times of activation/stop for counting the number of times of activation/stop of the server blades 130 to 132; and an operation-time measuring unit 163 for measuring a total operation time of the server blades 130 to 132.

The judging unit 150 includes: a judgment table 151; a maintaining unit 152 for a power activation threshold; a maintaining unit 153 for a power stop threshold; a maintaining unit 154 for the maximum number of stand-by server blades; a maintaining unit 155 for the minimum number of stand-by server blades; and a maintaining unit 156 for the minimum number of operating server blades.

In an example illustrated in FIG. 1, the server blade includes three server blades 130 to 132. However, the number of server blades is not limited to three, and any number of server blades can be used as long as they can be installed in the blade system 180. Also, the system may be not only one of the blade system 180 but also a plurality of connected blade systems 180.

Each of the server blades 130 to 132 is connected to an external network 110 via the load balancing blade 120, and every data communication from/to the client 100 is performed via the load balancing blade 120.

Also, in the load balancing blade 120, FIG. 1 illustrates an example that one load balancing blade 120 is installed. However, the number of load balancing blades is not limited to one. For example, two load balancing blades 120 may be installed in the blade system 180.

This case is that, for example, two load balancing blades 120 are configured as a redundant structure in which a stand-by load balancing blade for taking over the processing of a currently-operating load balancing blade is provided. In this case, even when the currently-operating load balancing blade is broken, the processing can be continued by switching the processing to the stand-by load balancing blade.

In the load balancing blade 120, a packet of the request from the client 100 is not directly transferred to the server blades 130 to 132, but received by the data-request receiving unit 121 once and transferred to any of the server blades 130 to 132 by the data-request transferring unit 122.

Also, in the server-blade monitoring unit 123, a processing status (a processing amount for the request from the client, the number of times of activation/stop, and a total operation time) of each of the server blades 130 to 132 is monitored.

The monitoring information in the server-blade monitoring unit 123 can be shared with the monitoring unit 160 for the server blade operation status included in the management server 190 which is mutually connected with the load balancing blade 120.

Further, in the maintaining unit 124 for the load balance threshold, a load balance threshold "A" transferred by the judging unit 150 is maintained. The load balance threshold A is a threshold used for starting the assignment of the request from the client 100. In the load balance, the processing amount assigned to the server blades 130 to 132 does not exceed the load balance threshold A every time, and, if it exceeds, the processing amount is assigned to a new operating server blade. This excess can be judged by the load balancing blade 120 itself which maintains the load balance threshold.

When the assigned processing proceeds to generate a margin of the processing amount in each of the server blades 130 to 132, a new processing from the client is assigned to a corresponding server blade by the load balancing blade 120 in accordance with a priority maintained in the priority maintaining unit 125.

That is, the request from the client can be always led to a server blade having a higher priority.

Also, the monitoring unit 160 for the server blade operation status in the management server 190 can share the server blade operation information acquired by the load balancing blade 120, and the acquired information can remain in the management server 190 as a history.

In the example illustrated in FIG. 1, the server blades 130 to 132 are monitored by the load balancing blade 120. However, a mode in which the server blades 130 to 132 are directly monitored by the monitoring unit 160 for the server blade operation status, or a mode in which they are monitored via a control unit installable in the blade system 180 may be used.

Further, the operation information acquired by the monitoring unit 160 for the server blade operation status is transferred to the judging unit 150 via the operation-information notifying unit 170.

the judging unit 150 in the management server 190 controls the power activation/stop, changes the priority, controls the thresholds, and controls the number of the operating server blades based on the operation information transferred from the monitoring unit 160 for the server blade operation status.

The priority is determined by the judgment table 151, and is periodically changed and is put in accordance with the total operation time or the number of times of the power activation/stop.

The status information of the server blade configuring the blade system 180 which is determined by the judgment table 151 can be transferred from the management server 190 to the load balancing blade 120. The load balancing blade 120 can recognize the transferred information from the management server 190, and can judge the information for a subsequent assignment of the request from the client 100 by itself.

The judging unit 150 maintains three types of thresholds which includes: a load balance threshold "A" used for assigning the processing to the stand-by server blade previously power-activated; a power activation threshold "B" used for activating the power of the stopping server blade; and a power stop threshold "C" used for stopping the power of the operating server blade. In the load balance, the processing amount assigned to the server blade does not exceed the load balance threshold A every time, and if it exceeds, the processing is assigned to a new operating server blade.

Here, the power stop threshold C is set to be smaller than the power activation threshold B. In the case of the repetitive increase and decrease in the request from the client 100 within the narrow range, even when the request from the client 100 is decreased and the processing amount is lowered than the power activation threshold B right after the processing amount exceeds the power activation threshold B, the sufficient decrease in the request from the client is further required as low as the power stop threshold C, and therefore, it can be avoided that the switching between the power activation and stop is frequently caused in a part of server blades.

Also, these thresholds can be freely set by a user in accordance with the usage of the system or change of the processing amount.

Here, the processing amount of each of the server blades 130 to 132 for the request from the client 100 monitored by the server-blade monitoring unit 123, the load balance threshold, the power activation threshold, and the power stop threshold maintained by the judging unit 150 are described.

In the present embodiment, for the above-described items, the following components can be exemplified.

For example, the components include: the number of simultaneous connections representing the number of requests from the client 100 which are processed by each of the server blades 130 to 132; the number of requested processing per unit time which is processed by each of the server blades 130 to 132; a response time of each of the server blades 130 to 132 for the request from the client 100; a processing-amount rate value which can be expressed by a ratio of the maximum processing volume of each of the server blades 130 to 132; a processing-amount fix value set in each of all server blades (except for the load balancing blade) configuring the blade system 180; and others.

For the control of the power activation/stop outputted from the judging unit 150, a signal of the control of the power activation/stop outputted from the management server 190 by, for example, LAN communication is received by the power controlling unit 140 in the blade system 180.

Here, inside the server blades 130 to 132, processors each called baseboard management controller (hereinafter, referred to as BMC) 133 to 135 which are control devices for the respective server blades are embedded.

The BMCs 133 to 135 communicate with each managing/managed device on a motherboard/chassis, does not depend on a CPU (Central Processing Unit), an OS (Operating System), and BIOS (Basic Input/Output System), and can control the system even from the status of the power stop.

In the blade system 180, the control of the power activation/stop is outputted from the power controlling unit 140 to each of the BMCs 133 to 135 embedded in an objective server blade by a communication method in conformity with Intelligent Platform Management Interface (hereinafter, referred to as IPMI) standard.

Here, the IPMI is a standard interface specification for monitoring, recovering, and remote-controlling states (temperature, voltage, fan, and bus) of a platform such as a server, and is known as a conventional technique.

Note that the control is performed by the communication method based on the IPMI as the example in the present embodiment. However, the method is not limited to this.

Here, inside the power controlling unit 140, the power activating unit 141 instructs the activation to the server blades 130 to 132 at the power activation, and the power stopping unit 142 instructs the stop to the server blades 130 to 132 at the power stop.

Figure 2:
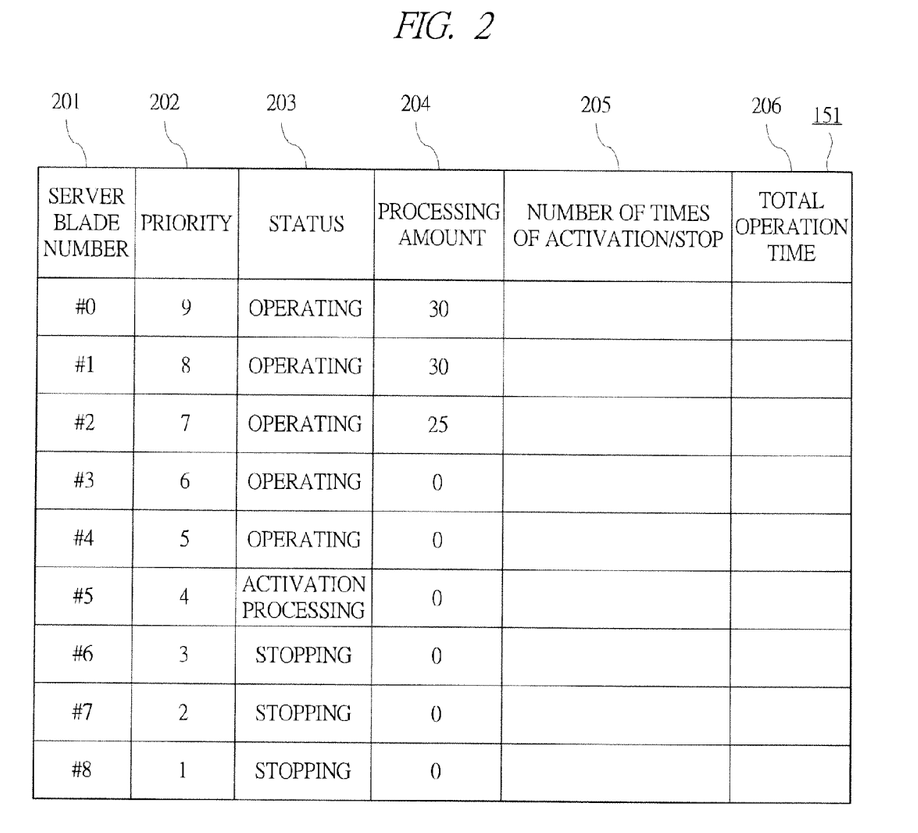
FIG. 2 is a diagram illustrating a judgment table used in a selection processing for activated/stopped server blades of the computer system according to the embodiment of the present invention.
Figure 3:
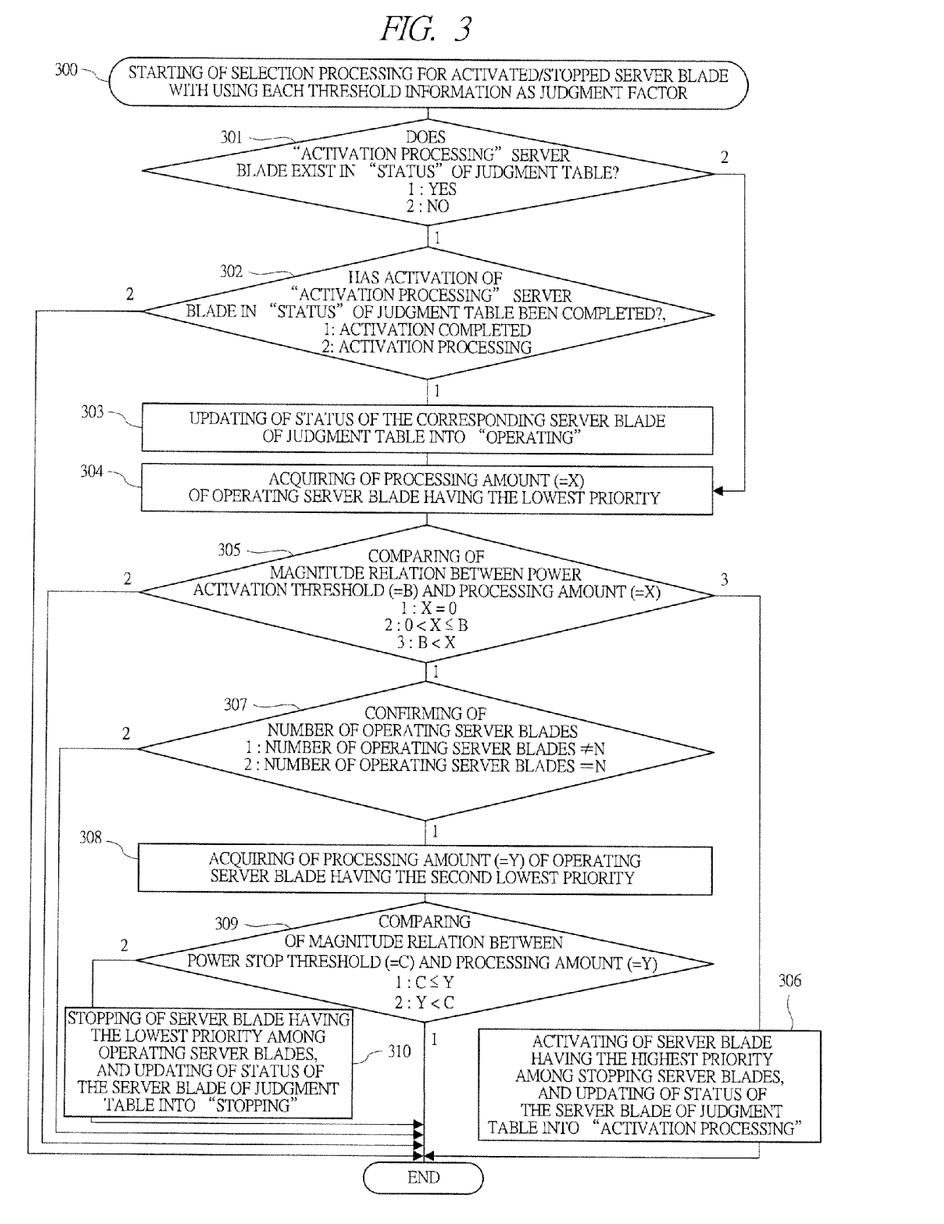
FIG. 3 is a flowchart illustrating the selection processing for the activated/stopped server blades of the computer system according to the embodiment of the present invention.
Figure 4:
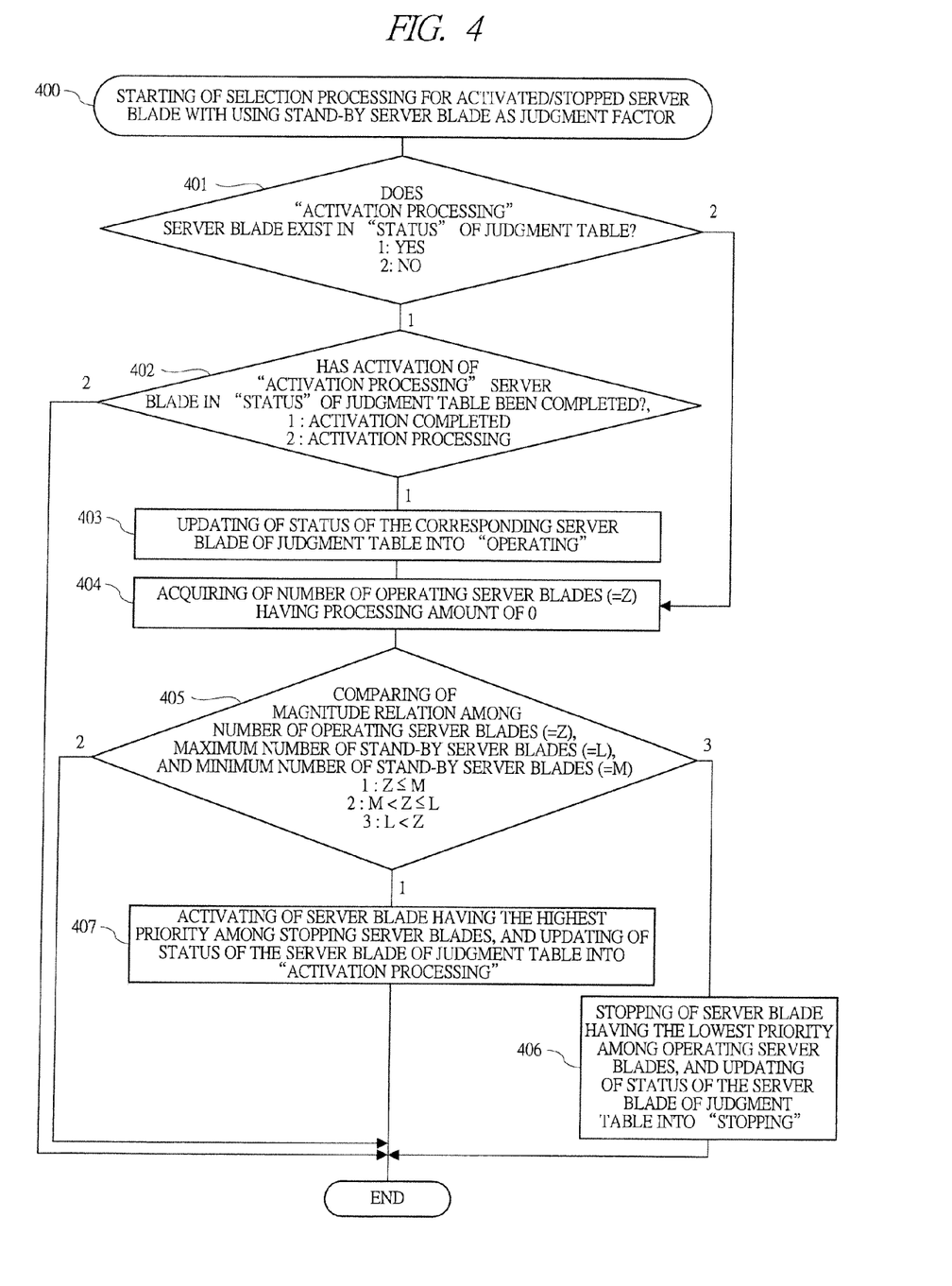
FIG. 4 is another flowchart illustrating the selection processing for the activated/stopped server blades of the computer system according to the embodiment of the present invention.

Next, with reference to FIGS. 2 to 4, the selection processing for the activated/stopped server blade of the computer system according to the embodiment of the present invention is described. FIG. 2 is a diagram illustrating an example of the judgment table used in the selection processing for the activated/stopped server blade of the computer system according to the embodiment of the present invention, FIGS. 3 and 4 are flowcharts each illustrating the selection processing for the activated/stopped server blade of the computer system according to the embodiment of the present invention, FIG. 3 illustrates a processing with using each threshold in the judging unit 150 as a judgment factor, and FIG. 4 illustrates a processing with using the number of stand-by server blades in the judging unit 150 as the judgment factor.

As illustrated in FIG. 2, the judgment table 151 includes items of a server blade number 201, a priority 202, a status 203, a processing amount 204, the number of times of activation/stop 205, and a total operation time 206.

As the server blade number 201, the judgment table maintains a number corresponding to a location where each of the server blades 130 to 132 is configured.

As the priority 202, the judgment table maintains a priority representing a priority order for assigning the request from the client 100 arbitrarily set in each of the server blades 130 to 132. Also, the priority is maintained in the load balancing blade 120 itself as well, and is used when the processing is practically assigned.

The status 203 represents a status of the server blade configuring the blade system 180. A status thereof in which the activation has been completed and the request from the client can be processed is set to "operating", a status thereof after receiving the instruction of the power activation and in the middle of the power activation is set to "activation processing", and a status thereof in which the power is not activated and the request from the client cannot be processed is set to "stopping".

As the processing amount 204, the judgment table maintains the requested amount from the client processed by each of the server blades 130 to 132 at an update of the judgment table 151.

As the total operation time 206, the judgment table maintains a total time of the continuous operation until the update of the judgment table 151.

As the number of times of activation/stop 205, the judgment table maintains the total number of times of switching counted in each switching between the activation and stop of each of the server blades 130 to 132 until the update of the judgment table 151.

Note that the example in FIG. 2 illustrates the judgment table 151 in a case of nine server blades configuring the blade system 180 for the explanation. However, the number of server blades is not limited to nine, and it may be the same as the number of server blades which can be configured in the blade system 180.

First, in the selection processing for the activated/stopped server blade with using each threshold information in the judging unit 150 as the judgment factor, as illustrated in FIG. 3, for judging the magnitude relations between a processing amount for the request from the client 100 and the power activation threshold B and between a processing amount and the power stop threshold C maintained in the respective power-activation-threshold maintaining unit 152 and the power-stop-threshold maintaining unit 153 included in the judging unit 150, the selection processing for the activated/stopped server blade is started (step 300).

And, as the status 203 of the judgment table 151, it is confirmed whether the "activation processing" server blade exists or not (step 301).

If the "activation processing" server blade exists in the step 301, as the status 203 of the judgment table 151, it is confirmed whether the activation of the "activation processing" server blade has been completed or not (step 302).

If the activation of the server blade has not been completed yet in the step 302 and the activation-processing server blade still exists, the processing is ended.

If the activation of the server blade has been completed in the step 302, the status 203 of the corresponding server blade of the judgment table 151 is updated into the "operating" in order to change the status into the "operating" (step 303).

And, the processing amount (=X) of the operating server blade having the lowest priority among the server blades whose status 203 of the judgment table 151 is the "operating" is acquired (step 304).

Further, if the "activation processing" server blade does not exist in the step 301, the processing proceeds to the step 304.

The magnitude relation between the power activation threshold (=B) and the processing amount (=X) acquired in the step 304 is compared with each other (step 305).

If it is judged that X is larger than 0 and equal to or smaller than B in the step 305, it means that the processing is required with certain processing amount and there is no sufficient processing amount for the activation of other server blades, and therefore, the processing is ended.

If it is judged that X is larger than B in the step 305, it means that the processing amount for the activation of other server blades exceeds the power activation threshold, and therefore, it is determined that the server blade having the highest priority among the stopping server blades is activated, the activation of the corresponding server blade is controlled, and the status of the judgment table 151 is updated into the "activation processing" (step 306) because the status of the corresponding server blade enters into the stage of the power activation processing in accordance with the activation control.

If it is judged that "X=0" in the step 305, it means that a server blade whose current processing amount is 0 exists, and therefore, the number of operating server blades in the blade system is confirmed, and is compared with the minimum number (=N) of operating server blades maintained in the maintaining unit 156 for the minimum number of operating server blades (step 307).

If a relation of "the number of operating server blades=the minimum number (=N) of operating server blades" is established in the step 307, the operating server blades cannot be stopped any more, and therefore, the processing is ended.

If a relation of "the number of operating server blades≠the minimum number (=N) of operating server blades" is confirmed in the step 307, that is, if the number of currently-operating server blades is larger than the minimum number (=N) of operating server blades because of no possibility that it is equal to or smaller than the minimum number (=N) of operating server blades, the processing-amount information (=Y) of the server blade having the second lowest priority among the operating server blades is acquired (step 308).

And, the magnitude relation between the acquired processing amount (=Y) and the power stop threshold (=C) is compared with each other (step 309).

If it is judged that Y is equal to or larger than C in the step 309, the processing is ended because, when the processing amount is increased later in the server blade having the second lowest priority, there is a possibility that the processing is assigned to the server blade having the lowest priority.

If it is judged that Y is smaller than C in the step 309, it is determined that the server blade having the lowest priority among the operating server blades is stopped, the stop of the corresponding server blade is controlled, and the status of the judgment table is updated into the "stopping" (step 310) because the status of the corresponding server blade enters into the stage of the power stop processing in accordance with the stop control.

Further, in the selection processing for the activated/stopped server blade with using each set number of server blades in the judging unit 150 as the judgment factor, as illustrated in FIG. 4, for judging the magnitude relation between the number of stand-by server blades and the maximum number "L" of stand-by server blades and between the number of stand-by server blades and the minimum number "M" of stand-by server blades maintained in the respective maintaining unit 154 for the maximum number of stand-by server blades and the maintaining unit 155 for the minimum number of stand-by server blades included in the judging unit 150, the selection processing for the activated/stopped server blade is started (step 400).

And, as the status 203 of the judgment table 151, it is confirmed whether the "activation processing" server blade exists or not (step 401).

If the "activation processing" server blade exists in the step 401, as the status 203 of the judgment table 151, it is confirmed whether the activation of the "activation processing" server blade has been completed or not (step 402).

If the activation of the server blade has not been completed yet in the step 402 and the "activation processing" server blade still exists, the processing is ended.

If the activation of the server blade has been completed in the step 402, the status 203 of the corresponding server blade of the judgment table 151 is updated into the "operating" in order to change the status into the "operating" (step 403).

And, the number of operating server blades (=Z) having the processing amount of 0 among the server blades whose status 203 of the judgment table 151 is the "operating" is acquired (step 404).

Further, if the "activation processing" server blade does not exist in the step 401, the processing proceeds to the step 404.

The magnitude relations between the number of operating server blades (=Z) acquired in the step 404 and the maximum number of stand-by server blades (=L) and between the number of operating server blades and the minimum number of stand-by server blades (=M) are compared with each other (step 405).

If it is judged that Z is larger than M and equal to or smaller than L in the step 405, it means that the number of stand-by server blades is within a range of an appropriate number, and therefore, the processing is ended.

If it is judged that Z is larger than L in the step 405, it means that the number of server blades having the processing amount of 0 is large, and therefore, it is determined that the server blade having the lowest priority among the operating server blades is stopped, the stop of the corresponding server blade is controlled, and the status of the judgment table is updated into the "stopping" (step 406) because the status of the corresponding server blade enters into the stage of the power stop processing in accordance with the stop control.

If it is judged that Z is equal to or smaller than M in the step 405, it means that the number of server blades having the processing amount of 0 is small, and therefore, it is determined that the server blade having the highest priority among the stopping server blades is activated, the activation of the corresponding server blade is controlled, and the status of the judgment table is updated into the "activation processing" (step 407) because the status of the corresponding server blade enters into the stage of the power activation processing in accordance with the activation control.

Next, a start timing of the judgment flow in FIGS. 3 and 4 and the update of the judgment table illustrated in FIG. 2 are described.

In the judgment flow in FIGS. 3 and 4, the judgment may be repeated every input of the request from the client 100 or may be periodically performed with time interval by which the processing can be smoothly performed as considering the usage of the system or others. Also, the timing may be freely set by a user.

Further, the judgment table 151 may be updated at timing in synchronization with the start timing or end timing of the judgment flow in FIGS. 3 and 4, or may be updated at not the timing in synchronization with the start timing of the judgment flow but a previously-set timing similarly to the start of the judgment flow. These setting tools can be easily installed by a software or others.

Figure 5:
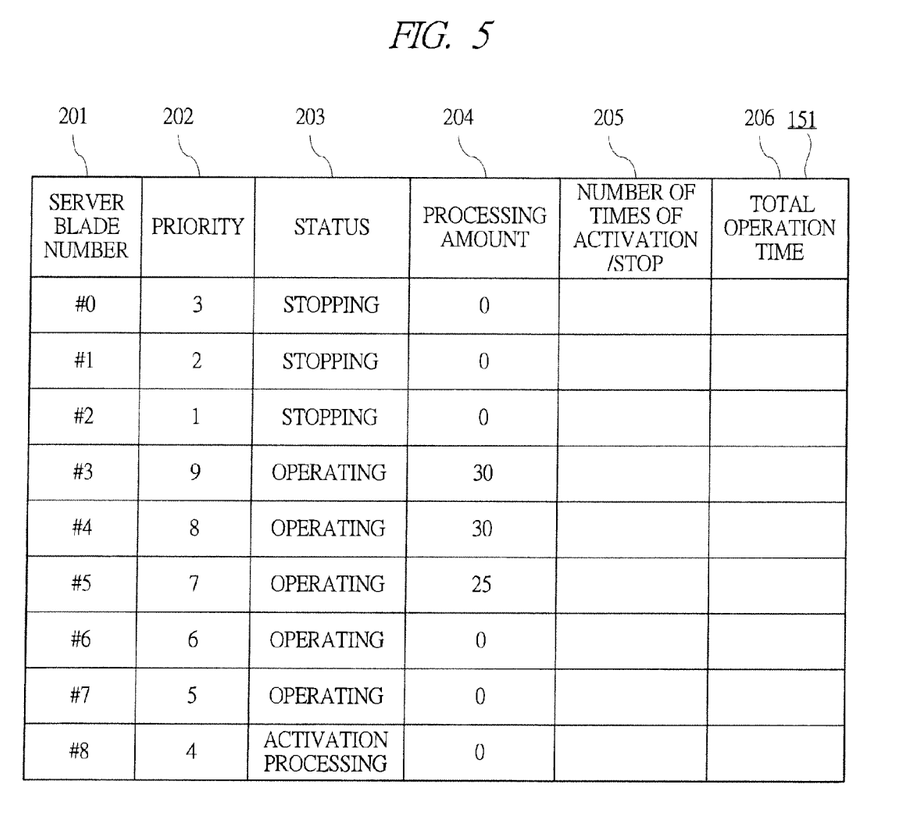
FIG. 5 is an explanatory diagram for explaining change of a priority of the computer system according to the embodiment of the present invention.
Figure 6:
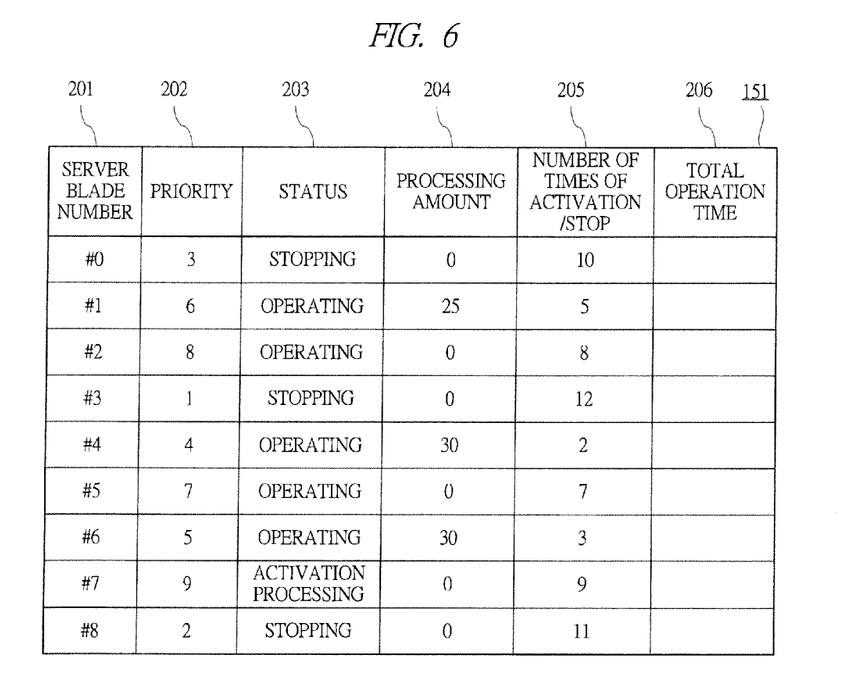
FIG. 6 is another explanatory diagram for explaining change of the priority of the computer system according to the embodiment of the present invention.
Figure 7:
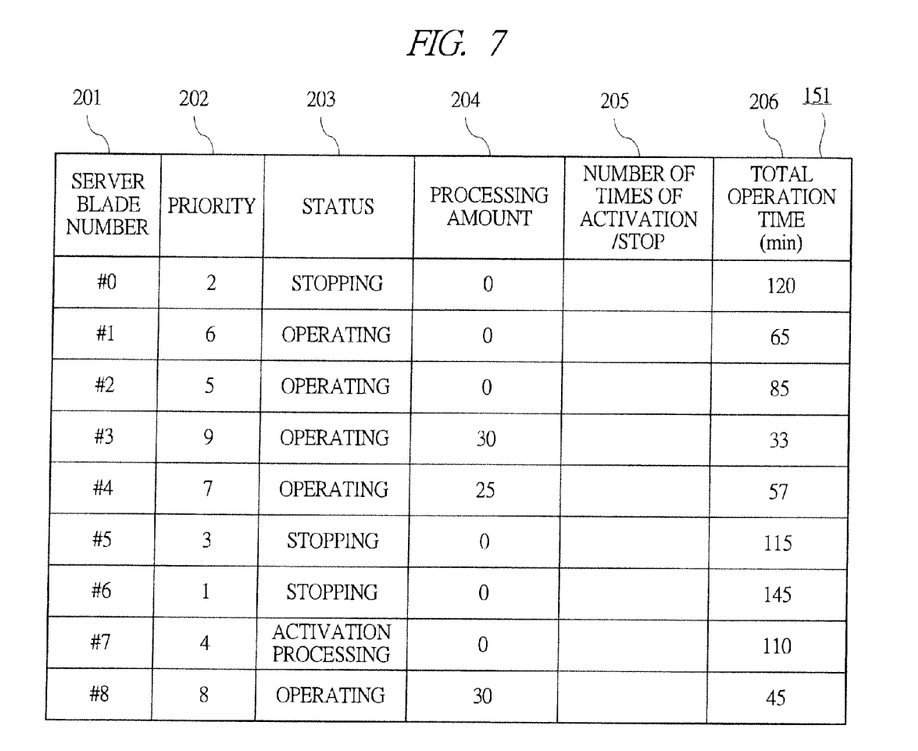
FIG. 7 is still another explanatory diagram for explaining change of the priority of the computer system according to the embodiment of the present invention.

Next, with reference to FIGS. 5 to 7, the change of the priority of the computer system according to the embodiment of the present invention is described. FIGS. 5 to 7 are explanatory diagrams for explaining the change of the priority of the computer system according to the embodiment of the present invention. Here, the conditions of the number of the activated/stopped server blade, the processing amount, and others are the same as those of the example illustrated in FIG. 2.

First, when the priority set in each server blade is periodically changed, as illustrated in FIG. 5, a priority 202 of a server blade number #0 in the judgment table 151 illustrated in FIG. 2 is slid into a priority of a server blade number #3 to slide an operated server blade into a server blade having a large server blade number by three blades.

In a case of not assuming large variation in the processing amount as the usage of the system, by setting the periodic automatic or manual change of the priority 202, the unbalance among the operating server blade can be easily avoided. Also, for the timing of the change, various schedules such as daily change and weekly change can be set.

Further, when the unbalance among the number of times of activation/stop is avoided by setting the priority 202 of the server blade having the smaller number of times of activation/stop 205 among the stopping server blades to higher and setting the priority 202 of the server blade having the larger number of times of activation/stop 205 among the operating server blades to lower, as illustrated in FIG. 6, first, the priority 202 of the server blade having the larger number of times of activation/stop 205 among the operating server blades (#1, #2, #4, #5, #6, and #7) in the judgment table 151 is set to higher.

Contrarily, the priority 202 of the server blade having the smaller number of times of activation/stop 205 among the stopping server blades (#0, #3, and #8) therein is set to higher.

Therefore, the priority 202 of the server blade having the smaller number of times of activation/stop 205 among the operating server blades is set to lower, and thus, the power is stopped preferentially to the server blade having the smaller number of times of activation/stop 205 among the operating server blades. Further, the priority 202 of the server blade having the smaller number of times of activation/stop 205 among the stopping server blades is set to higher, and thus, the power is activated preferentially to the server blade having the smaller number of times of activation/stop 205 among the stopping server blades. Therefore, the unbalance among the number of times of activation/stop can be avoided.

The number of times of activation/stop of the server blade relates to a life of the server blade, and therefore, unbalance among the life of the server blades can be avoided by avoiding the unbalance among the number of times of activation/stop.

Still further, when the unbalance among the operation time is avoided by setting a priority of a server blade having a shorter total operation time to higher, as illustrated in FIG. 7, the priority 202 of the server blade having the shorter total operation time 206 is set to higher.

For example, the total operation time of the server blade number #3 is 33 [min] which is the shortest among those of the configuring server blades. Therefore, its priority is set to 9, and it becomes a server blade to which the processing is most preferentially assigned.

Therefore, regardless of the stopping and operating statuses in server blades, the priority 202 of the server blade having the shorter total operation time is set to higher, and thus, the server blade having the short total operation time is preferentially activated if it is stopping, or the processing is preferentially assigned to the server blade if it is operating, so that the unbalance among their total operation time can be avoided.

In the foregoing, the invention made by the inventors of the present invention has been concretely described based on the embodiments. However, it is needless to say that the present invention is not limited to the foregoing embodiments and various modifications and alterations can be made within the scope of the present invention.

For example, in the present embodiment, the computer system has the configuration illustrated in FIG. 1. However, the configuration is not limited to this, and the present invention can be used even in the following configurations.

In the server blades 130 to 132, their configurations are the server blades embedded in the blade system 180. However, their configurations are not necessarily as the server blades, and they may be individual different computers.

Also, in the blade system 180, the load balancing blade 120 and the power controlling unit 140 are embedded. However, they are not necessarily as embedded in the blade system 180, and may be external individual devices outside the blade system 180.

Further, the management server 190 is configured outside the blade system 180. However, it is not necessarily as configured outside, and it may be one blade embedded in the blade system 180.

Still further, in the management server 190, the monitoring unit 160 for the server blade operation status, the operation-information notifying unit 170, and the judging unit 150 are configured inside the management server 190. However, they are not necessarily as configured inside the management server 190, and may be individual different devices.

Still further, in the computer system, the server blades 130 to 132 may exist as virtual server blades, that is, virtual server blades logically divided on a physical server blade.

Note that, in a case that the other virtual server blade on the same physical server blade is operated when one server blade is stopped, the power of the corresponding physical server blade cannot be stopped, and therefore, the power consumption of the blade system 180 cannot be significantly reduced.

However, if the virtual server blade can be rearranged in a space of a different physical server blade from the corresponding physical server blade, by providing a physical server blade of not processing the request from the client to lower the power of the corresponding physical server blade, the power consumption of the blade system 180 can be suppressed.

Still further, in the load balance threshold and the power activation threshold maintained in the judging unit 150, by providing a threshold setting tool on the management server 190 or the control units or others inside the server blades 130 to 132 which can instruct to the load balancing blade 120, each preferable threshold can be set by a user own.

For example, a case of a ticket selling site or others as the usage of the system is considered, in which requests from users are concentrated to the system at one moment, and load to the system is rapidly increased.

In this case, if a margin can be provided between the power activation threshold for activating the stopping server blade and the load balance threshold for starting the assignment of the requests from the users, when the rapidly-increased requests from the users exceed the load balance threshold of the system, the power activation of an additional server blade could have been already completed without the influence of the operation, and the request can be assigned to the server blade, so that a system in which data supply to the users is not delayed can be achieved.

Still further, in a case of embedding an EEPROM in each server blade, the EEPROM being called field replacement unit (hereinafter, referred to as FRU) in which, for example, a manufacturer or a serial number is stored, a power consumption value of each server blade can be set and stored in the corresponding FRU at manufacturing a device.

In this case, similarly to the present embodiment, by recognizing the power consumption value by the server-blade monitoring unit 123, adding the value as the judgment condition maintained in the judging unit 150, and setting a priority of a server blade having smaller power consumption to higher, power saving effect can be obtained.

INDUSTRIAL APPLICABILITY

The present invention relates to a computer system including: a management server; and a blade system including a plurality of server blades. The computer system is mounted on a load balancing blade which can be mounted inside a blade system, a load balancer which is mounted outside the blade system and is connected to the blade system or a group of individual computers so as to provide a load balancing function to each server blade or the group of computers, or others, and the computer system can be used as a part of a server system.

The invention claimed is:

1. A computer system comprising a blade system and a management server, the blade system comprising:

a plurality of server blades configured to process a request from a client;

a power controlling unit configured to provide an instruction for activation and stopping of each of the plurality of server blades;

a priority maintaining unit configured to maintain a priority of each of the plurality of server blades; and a load balancing blade configured to assign a processing of the request from the client preferentially with respect to an operating one of the server blades having a high priority rather than an operating one of the server blades having a low priority, and the management server comprising:

a monitoring unit configured to acquire a number of times of activation/stop and a processing amount of each of the plurality of server blades from the blade system;

a judgment table for storing the number of times of activation/stop and the processing amount of each of the plurality of server blades; and a judging unit configured to maintain a power activation threshold, set a first one of the server blades, which is operating and which has a smallest number of times of activation/stop among a plurality of operating server blades, to have a lowest priority among the plurality of operating server blades, set a second one of the server blades, which is stopping and which has a smallest number of times of activation/stop among a plurality of stopping server blades, to have a highest priority among the plurality of stopping server blades, and control the power controlling unit so as to activate the second server blade having the highest priority among the plurality of stopping server blades when a first processing amount of the first server blade is larger than the power activation threshold.

2. The computer system according to claim 1, wherein the judgment table is configured to maintain the priority, and the judging unit is configured to activate a server blade having the highest priority among the plurality of stopping server blades when the request from the client is increased, and to stop a server blade having the lowest priority among the plurality of operating server blades when the request from the client is decreased.

3. The computer system according to claim 2, wherein
a load balance threshold is larger than the power activation threshold, and the power activation threshold is larger than a power stop threshold, and
the judging unit is configured to control providing of a stand-by server blade which is operating but to which the processing of the request is not assigned by the load balancing blade, based on information from the judgment table, the power activation threshold, and the power stop threshold.

4. The computer system according to claim 3, wherein the judging unit is configured to include:
a first maintaining unit configured to maintain a maximum number of stand-by server blades; and
a second maintaining unit configured to maintain a minimum number of stand-by server blades, and
wherein the judging unit is configured to control the number of stand-by server blades based on the maximum number of stand-by server blades and the minimum number of stand-by server blades.

5. The computer system according to claim 4, wherein the judging unit is further configured to include:
a maintaining unit configured to maintain a minimum number of operating server blades, and
wherein the judging unit is configured to control the number of stand-by server blades based on the minimum number of operating server blades, the maximum number of stand-by server blades, and the minimum number of stand-by server blades.

6. The computer system according to claim 1, wherein the management server is configured to periodically change the priority.

7. The computer system according to claim 6, wherein the management server is configured to set a priority of a server blade having a shorter total operation time among the plurality of server blades so as to be higher.

* * * * *